United States Patent
Song et al.

(10) Patent No.: US 10,174,697 B2
(45) Date of Patent: Jan. 8, 2019

(54) FUEL SUPPLY DEVICE FOR LPDI ENGINE AND START CONTROL METHOD OF LPDI ENGINE HAVING THE FUEL SUPPLY DEVICE

(71) Applicants: Hyundai Motor Company, Seoul (KR); Kia Motors Corporation, Seoul (KR)

(72) Inventors: Jin Oh Song, Hwaseong-si (KR); Do Wan Kim, Yongin-si (KR); Jong Suk Lim, Gwangju-si (KR); Han Yong Park, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/610,257

(22) Filed: May 31, 2017

(65) Prior Publication Data

US 2018/0010537 A1 Jan. 11, 2018

(30) Foreign Application Priority Data

Jul. 5, 2016 (KR) ........................ 10-2016-0084583

(51) Int. Cl.
*F02M 1/00* (2006.01)
*F02D 41/06* (2006.01)
*F02D 41/30* (2006.01)
*F02D 41/38* (2006.01)
*F02M 21/02* (2006.01)
*F02M 37/00* (2006.01)
*F02D 41/00* (2006.01)

(52) U.S. Cl.
CPC ....... *F02D 41/062* (2013.01); *F02D 41/0027* (2013.01); *F02D 41/3082* (2013.01);
(Continued)

(58) Field of Classification Search
CPC ............... F02M 33/08; F02M 37/0023; F02M 37/0029; F02M 37/0052; F02M 55/00; F02M 69/54
(Continued)

(56) References Cited

U.S. PATENT DOCUMENTS

| 9,957,935 B2* | 5/2018 | Pursifull ............. F02M 55/007 |
| 2011/0146600 A1* | 6/2011 | Rajagopalan .......... F02M 53/00 123/41.31 |

(Continued)

FOREIGN PATENT DOCUMENTS

| JP | 2003-269256 A | 9/2003 |
| JP | 2004-150333 A | 5/2004 |

(Continued)

*Primary Examiner* — John Kwon
(74) *Attorney, Agent, or Firm* — Morgan, Lewis & Bockius LLP

(57) ABSTRACT

A fuel supply device for a liquefied petroleum direct injection (LPDI) engine in which liquefied petroleum gas (LPG) is directly injected into a combustion chamber and a start control method of an LPDI engine having the fuel supply device, wherein the high pressure fuel pump receives and compresses fuel to a pressure higher than a pressure at which fuel has been supplied, wherein the high pressure fuel rail buffers and supplies fuel to a direct injector that injects fuel directly into a combustion chamber, wherein the return line is connected to the supply line through the high pressure fuel pump to form a low pressure line, allowing a surplus portion of fuel supplied to the high pressure fuel pump from the fuel tank to return to the fuel tank, and wherein a first valve is disposed on the return line to control the flow rate of returning fuel.

10 Claims, 3 Drawing Sheets

(52) U.S. Cl.
CPC ....... *F02D 41/3854* (2013.01); *F02M 21/023* (2013.01); *F02M 21/0245* (2013.01); *F02M 37/0023* (2013.01); *F02M 37/0052* (2013.01); *F02D 2041/389* (2013.01); *F02D 2200/0602* (2013.01); *F02D 2200/0606* (2013.01)

(58) Field of Classification Search
USPC .................................................. 123/510–515
See application file for complete search history.

(56) References Cited

U.S. PATENT DOCUMENTS

| | | | |
|---|---|---|---|
| 2014/0311445 A1* | 10/2014 | Ten Broeke | F02D 19/0621 123/304 |
| 2015/0059701 A1* | 3/2015 | Song | F02M 21/0212 123/445 |
| 2016/0084172 A1* | 3/2016 | Ten Broeke | F02D 41/3845 123/468 |
| 2016/0160790 A1* | 6/2016 | Pursifull | F02D 41/3082 123/294 |

FOREIGN PATENT DOCUMENTS

| | | |
|---|---|---|
| JP | 2005-139910 A | 6/2005 |
| JP | 2014-66231 A | 4/2014 |
| KR | 10-0644126 B1 | 11/2006 |
| KR | 10-2007-0027950 A | 3/2007 |
| KR | 10-2012-0103834 A | 9/2012 |

\* cited by examiner

FUEL SUPPLY DEVICE FOR LPDI ENGINE AND START CONTROL METHOD OF LPDI ENGINE HAVING THE FUEL SUPPLY DEVICE

CROSS REFERENCE TO RELATED APPLICATION

The present application claims priority to Korean Patent Application No. 10-2016-0084583, filed Jul. 5, 2016, the entire contents of which is incorporated herein for all purposes by this reference.

BACKGROUND OF THE INVENTION

Field of the Invention

The present invention generally relates to a fuel supply device for a liquefied petroleum direct injection (LPDI) engine in which liquefied petroleum gas (LPG) is directly injected into a combustion chamber and a start control method of an LPDI engine having the fuel supply device.

Description of Related Art

A conventional liquefied petroleum injection (LPI) engine is configured to inject liquefied petroleum gas (LPG) supplied from a fuel tank into an intake port thereof without gasifying LPG through a mixer, so that LPG burns in a combustion chamber.

In contrast, an LPDI engine is configured to inject LPG supplied from a fuel tank directly into a combustion chamber instead of into an intake port thereof by compressing LPG to a high pressure. The LPDI engine requires a fuel supply technology enabling fuel supplied from the fuel tank to be compressed to a high pressure before being injected directly into the combustion chamber.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel supply device for a liquefied petroleum direct injection (LPDI) engine in which liquefied petroleum gas (LPG) is directly injected into a combustion chamber and a start control method of an LPDI engine having the above-described fuel supply device, the fuel supply device being able to prevent a delay in starting due to a phenomenon including vapor locking, and obtain a suitable level of starting ability during the start of the engine.

In an aspect of the present invention, a fuel supply device for an LPDI engine may include: a high pressure fuel pump receiving fuel supplied through a supply line from a fuel tank and compressing fuel to a pressure higher than a pressure at which fuel has been supplied; a high pressure fuel rail buffering fuel compressed by the high pressure fuel pump and supplying buffered fuel to a direct injector that injects fuel directly into a combustion chamber; a return line connected to the supply line through the high pressure fuel pump to form a low pressure line, the return line allowing a surplus portion of fuel supplied to the high pressure fuel pump from the fuel tank that has not been supplied to the high pressure fuel rail to return to the fuel tank; and a first valve disposed on the return line to control the flow rate of returning fuel.

The fuel supply device may further include: a low pressure fuel pump pumping fuel from the fuel tank to feed to the high pressure fuel pump through the supply line; a second valve disposed within the fuel tank to close a supply of fuel from the low pressure fuel pump to the supply line when the engine of a vehicle is turned off; a third valve disposed on the supply line in an engine compartment to close a supply of oil from the supply line to the high pressure fuel pump; and a pressure regulator regulating a pressure of fuel returning between the first valve of the return line and the fuel tank.

In the fuel supply device, the third valve may include a first temperature sensor measuring a temperature of fuel in the supply line. The pressure regulator may include a first pressure sensor measuring a pressure of fuel in the low pressure line. The high pressure fuel rail may include a second temperature sensor measuring a temperature of fuel within the high pressure fuel rail and a second pressure sensor measuring a pressure of fuel within the high pressure fuel rail. The fuel supply device may further include a controller controlling the first valve by receiving signals from the first temperature sensor, the second temperature sensor, the first pressure sensor, and the second pressure sensor.

According to another aspect of the present invention, provided is a start control method of an engine using the above-described fuel supply device. The start control method may include: obtaining a pressure of fuel in the low pressure line and storing the obtained pressure as an initial pressure of the low pressure line in response to an engine start request; determining a high reference start pressure that is a minimum pressure of fuel in the high pressure fuel rail at which an engine is configured to start; determining whether or not a pressure of fuel within the high pressure fuel rail exceeds the high reference start pressure; when the pressure of fuel within the high pressure fuel rail exceeds the high reference start pressure as a result of determining whether or not the pressure of fuel within the high pressure fuel rail exceeds the high reference start pressure, opening the first valve of the return line and operating the low pressure fuel pump; when the process of opening the first valve of the return line and operating the low pressure fuel pump is started, determining whether or not the pressure of fuel in the low pressure line has reached a level sufficient for the engine to start; and starting the engine when the pressure of fuel in the low pressure line has reached a level sufficient for the engine to start as a result of the process of determining whether or not the pressure of fuel in the low pressure line has reached the level sufficient for the engine to start.

The process of obtaining the pressure of fuel in the low pressure line and storing the obtained pressure may be performed by the controller by determining the pressure of fuel in the low pressure line using the first pressure sensor disposed on the low pressure line. The process of determining the high reference start pressure may be performed by the controller using a temperature of fuel measured using the second temperature sensor disposed on the high pressure fuel rail. The process of determining whether or not the pressure of fuel within the high pressure fuel rail may exceed the high reference start pressure is performed by the controller. The process of opening the first valve of the return line and operating the low pressure fuel pump may be performed by the controller by opening the first valve and controlling the low pressure fuel pump. The process of determining whether or not the pressure of fuel in the low pressure line has reached the level sufficient for the engine to start and the process of starting the engine may be performed by the controller.

In the process of determining the high reference start pressure, the high reference start pressure may be determined by adding a correction value to a minimum start high pressure obtained from the temperature of fuel in the high pressure fuel rail and a map of minimum start high pressures depending on contents of butane of fuel in the high pressure fuel rail, the correction value being set in consideration of an error.

In the process of opening the first valve of the return line and operating the low pressure fuel pump, a period of time in which the low pressure fuel pump is to operate at a maximum speed may be set using a first timer, in consideration of the temperature of cooling water of the engine, and while the process of determining whether or not the pressure of fuel in the low pressure line has reached the level sufficient for the engine to start is not satisfied after the time period set by the first timer has elapsed, the low pressure fuel pump may continue to be operated at the maximum speed.

When the process of determining whether or not the pressure of fuel in the low pressure line has reached the level sufficient for the engine to start is not satisfied after the time period set by the first timer, the process of starting the engine may be performed.

In the process of determining whether or not the pressure of fuel in the low pressure line has reached the level sufficient for the engine to start, the pressure of fuel in the low pressure line may be determined whether or not the pressure of fuel in the low pressure line has reached the level sufficient for the engine to start, based on whether or not the pressure of fuel in the low pressure line is greater than a greater one of a minimum start low pressure obtained from a map of minimum start low pressures depending on temperatures of fuel in the low pressure line and butane contents of fuel in the low pressure line and a pressure obtained by adding a confirming correction pressure to the initial pressure of the initial line stored in the process of obtaining the pressure of fuel in the low pressure line and storing the obtained pressure, the confirming correction pressure allowing a sufficient rise in the pressure of the low pressure line to be determined.

The start control method may further include: when the pressure of fuel in the high pressure fuel rail does not exceed the high reference start pressure as a result of the process of determining whether or not the pressure of fuel within the high pressure fuel rail exceeds the high reference start pressure, closing the first valve of the return line and operating the low pressure fuel pump; after the process of closing the first valve of the return line and operating the low pressure fuel pump is started, determining whether or not the pressure of fuel in the high pressure fuel rail exceeds the high reference start pressure; when the pressure of fuel in the high pressure fuel rail exceeds the high reference start pressure as a result of the process of determining whether or not the pressure of fuel in the high pressure fuel rail exceeds the high reference start pressure, opening the first valve; and after the process of opening the first valve is started, determining whether or not the pressure of fuel in the low pressure line has reached a level sufficient for the engine to start.

In the process of closing the first valve of the return line and operating the low pressure fuel pump, a time period in which the low pressure fuel pump is to be operated at a maximum speed may be set by a second timer, the maximum speed being set in consideration of a difference between the high reference start pressure and the pressure of fuel in the high pressure fuel rail and the temperature of cooling water of the engine. While the process of determining whether or not the pressure of fuel in the high pressure fuel rail exceeds the high reference start pressure is not satisfied in the period of time set by the second timer, the low pressure fuel pump may continue to be operated at the maximum speed.

When the process of determining whether or not the pressure of fuel in the high pressure fuel rail exceeds the high reference start pressure is not satisfied after the time period set by the second timer has elapsed, the first valve may be opened and the process of starting the engine may be performed.

When the process of determining whether or not the pressure of fuel in the low pressure line has reached the level sufficient for the engine to start is not satisfied after the time period set by the second timer has elapsed, the process of starting the engine may be performed.

In the process of determining whether or not the pressure of fuel in the low pressure line has reached the level sufficient for the engine to start, the pressure of fuel in the low pressure line may be determined whether or not the pressure of fuel in the low pressure line has reached the level sufficient for the engine to start, based on whether or not the pressure of fuel in the low pressure line is greater than a greater one of a minimum start low pressure obtained from a map of minimum start low pressures depending on the temperature of fuel in the low pressure line and butane contents of fuel in the low pressure line and a pressure obtained by adding a confirming correction pressure to the initial pressure of the initial line stored in the process of obtaining the pressure of fuel in the low pressure line and storing the obtained pressure, the confirming correction pressure allowing a sufficient rise in the pressure of the low pressure line to be determined.

In an aspect of the present invention, it is possible to prevent a delay in starting due to a phenomenon including vapor locking, and obtain a suitable level of starting ability during the start of an LPDI engine in which LPG is directly injected into a combustion chamber.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
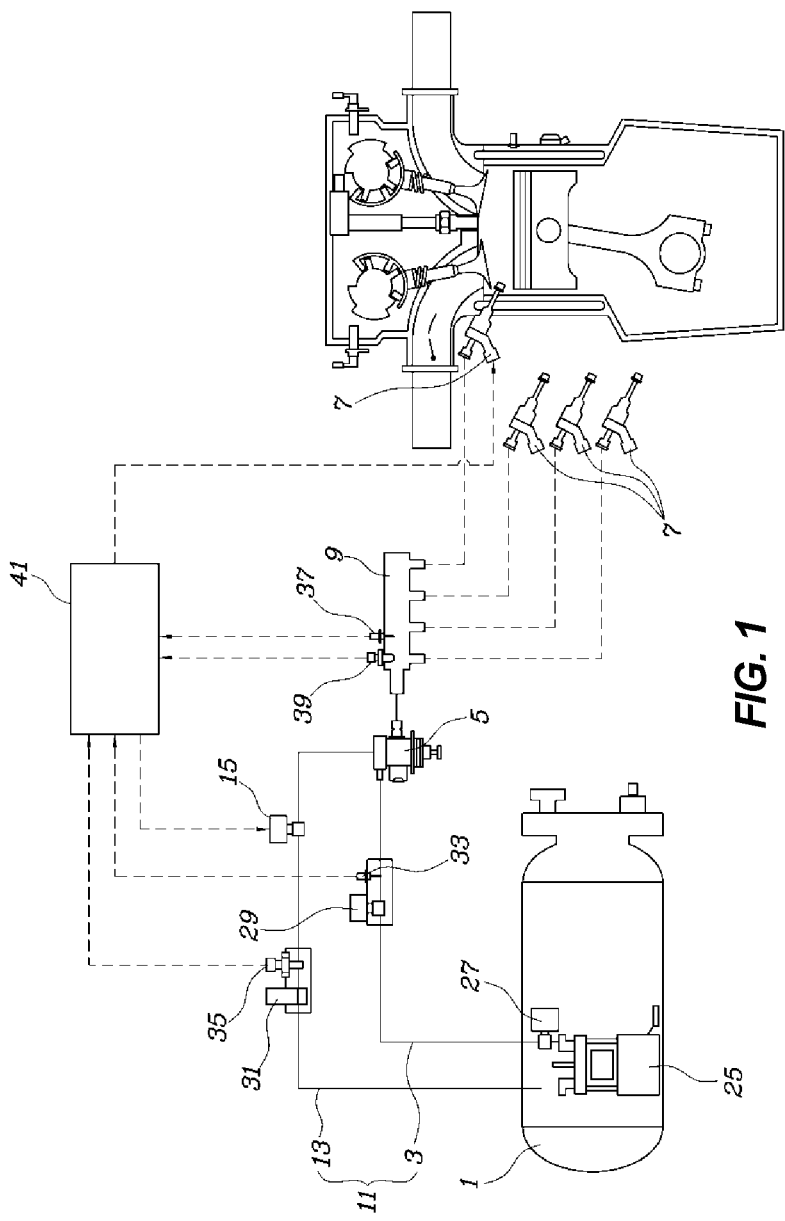
FIG. 1 is a schematic view illustrating a fuel supply device for an LPDI engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings. Throughout the drawings, the same reference numerals will refer to the same or like parts.

Referring to FIG. 1, a fuel supply device for a liquefied petroleum direct injection (LPDI) engine according to an exemplary embodiment of the present invention may include a high pressure fuel pump 5 receiving fuel supplied through a supply line 3 from a fuel tank 1 and compressing fuel to a pressure higher than a pressure at which fuel has been supplied; a high pressure fuel rail 9 buffering fuel compressed by the high pressure fuel pump 5 and supplying buffered fuel to a direct injector 7 that injects fuel directly into a combustion chamber; a return line 13 connected to the supply line 3 through the high pressure fuel pump 5 to form a low pressure line 11, the return line 13 allowing a surplus portion of fuel supplied to the high pressure fuel pump 5 from the fuel tank 1 that has not been supplied to the high pressure fuel rail 9 to return to the fuel tank 1; and a first valve 15 disposed on the return line 13 to control the flow rate of returning fuel.

Figure 2:
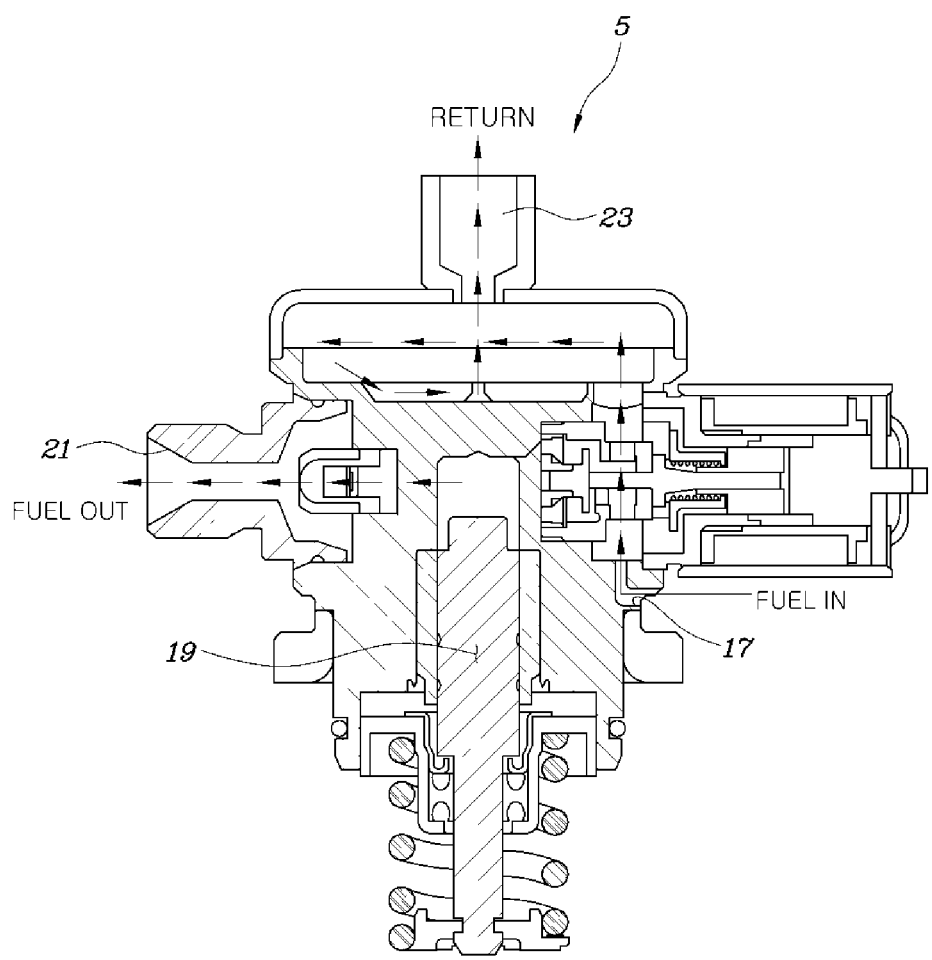
FIG. 2 is a cross-sectional view illustrating the high pressure fuel pump used in FIG. 1.

As illustrated in FIG. 2, referring to the configuration of the high pressure fuel pump 5, fuel supplied through the supply line 3 is received through an inlet port 17, is compressed using a plunger 19 that reciprocally moves when the engine operates, is discharged through a high pressure port 21, and then is supplied to the high pressure fuel rail 9. In addition, the surplus portion of fuel is allowed to pass through a return port 23 and then the return line 13 to return to the fuel tank 1.

Here, the inlet port 17 an the return port 23 remain substantially communicating with each other, and the supply line 3 and the return line 13 form the low pressure line 11 at the same pressure. With this configuration, during the operation of the engine, the pressure of fuel in the low pressure line 11 does not have an effect on control over the pressure of fuel in the high pressure fuel rail 9, whereby control over the pressure of fuel in the high pressure fuel rail 9 can be more accurately and reliably performed.

In addition, the fuel supply device may further include a low pressure fuel pump 25 pumping fuel from the fuel tank 1 to feed to the high pressure fuel pump 5 through the supply line 3; a second valve 27 disposed within the fuel tank 1 to close the supply of fuel from the low pressure fuel pump 25 to the supply line 3 when the engine of a vehicle is turned off; a third valve 29 disposed on the supply line 3 in an engine compartment to close the supply of oil from the supply line 3 to the high pressure fuel pump 5; and a pressure regulator 31 regulating the pressure of fuel returning between the first valve 15 of the return line 13 and the fuel tank 1.

The third valve 29 has a first temperature sensor 33 measuring the temperature of fuel in the supply line 3, and the pressure regulator 31 has a first pressure sensor 35 measuring the pressure of fuel in the low pressure line 11. The high pressure fuel rail 9 is provided with a second temperature sensor 37 measuring the temperature of fuel within the high pressure fuel rail 9 and a second pressure sensor 39 measuring the pressure of fuel in the high pressure fuel rail 9. A controller 41 controls the first valve 15 by receiving signals from the first temperature sensor 33, the second temperature sensor 37, the first pressure sensor 35, and the second pressure sensor 39.

Figure 3:
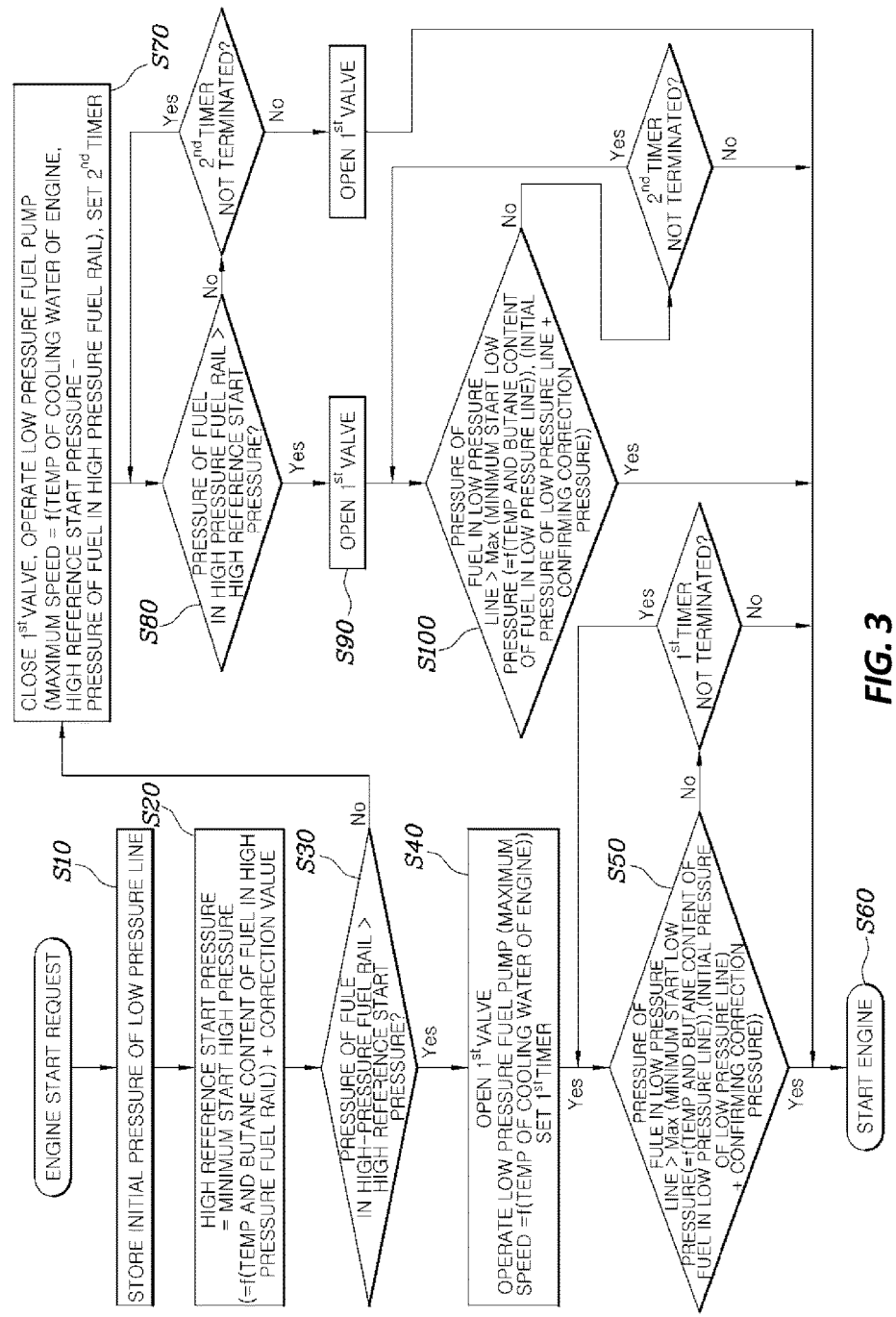
FIG. 3 is a flowchart illustrating a start control method of an LPDI engine by a controller according to an exemplary embodiment of the present invention.

As illustrated in FIG. 3, a start control method of an LPDI engine having the above-described fuel supply device and performed by the controller 41 according to an exemplary embodiment of the present invention may include initial pressure storing step S10 of obtaining the pressure of fuel in the low pressure line 11 and storing the obtained pressure as an initial pressure of the low pressure line 11 in response to an engine start request; reference setting step S20 of determining a high reference start pressure that is the minimum pressure of fuel within the high pressure fuel rail 9 at which the engine can start; first high reference determination step S30 of determining whether or not the pressure of fuel within the high pressure fuel rail 9 exceeds the high reference start pressure; first start preparation step S40 of opening the first valve 15 of the return line 13 and operating the low pressure fuel pump 25 when the pressure of fuel within the high pressure fuel rail 9 exceeds the high reference start pressure as the result of the first high reference determination step S30; first low reference determination step S50 determining whether or not the pressure of fuel in the low pressure line 11 has reached a level sufficient for the engine to start after the start of the first start preparation step S40; and start step S60 of starting the engine when the pressure of fuel in the low pressure line 11 has reached a level sufficient for the engine to start as the result of the first low reference determination step S50.

That is, according to the present embodiment, after the initial pressure storing step S10 and the reference setting step S20, the pressure of fuel in the high pressure fuel rail 9 is determined whether or not to be at the level sufficient for the engine to start in the first reference determination step S30. When the pressure of fuel in the high pressure fuel rail 9 is determined to be sufficient for the engine to start, the pressure of fuel in the low pressure line 11 is sufficiently obtained in the first start preparation step S40 and then is determined whether or not it has reached the level sufficient for the engine to start in the first low reference determination step S50 before the engine is started.

The initial pressure storing step S10 is performed by the controller 41 by determining the pressure of fuel in the low pressure line 11 using the first pressure sensor 35 disposed on the low pressure line 11. The reference setting step S20 is performed by the controller 41 using the temperature of fuel measured using the second temperature sensor 37 disposed on the high pressure fuel rail 9. The first high reference determination step S30 is performed by the controller 41. The first start preparation step S40 is performed by the controller 41 by opening the first valve 15 and controlling the low pressure fuel pump 25. The first low reference determination step S50 and the start step S60 are performed by the controller 41.

In the reference setting step S20, the high reference start pressure is calculated by adding a correction value to a minimum start high pressure obtained from the temperature of fuel in the high pressure fuel rail 9 and a map of minimum start high pressures depending on the contents of butane of fuel in the high pressure fuel rail 9, the correction value being set in consideration of an error. The correction value may be, for example, 1 bar.

In the first start preparation step S40, a time period in which the low pressure fuel pump 25 is to operate at a maximum speed is set using a first timer, in consideration of the temperature of cooling water of the engine. While the first low reference determination step S50 is not satisfied after the elapse of the time period set by the first timer, the low pressure fuel pump 25 continues to be operated at the maximum speed.

Here, the maximum speed in which the temperature of cooling water of the engine is considered may be determined from a map or a function expression of maximum speeds of the low pressure fuel pump 25 predetermined depending on the temperature of cooling water of the engine. The time period set by the first timer may be, for example, 10 seconds.

When the first low reference determination step S50 is not satisfied after the time period set by the first timer, the start step S60 is performed.

In the first low reference determination step S50, the pressure of fuel in the low pressure line 11 is determined whether or not it has reached the level sufficient for the engine to start, based on whether or not the pressure of fuel in the low pressure line 11 is greater than a greater one of a minimum start low pressure obtained from a map of minimum start low pressures depending on the temperature of fuel in the low pressure line 11 and the contents of butane of fuel in the low pressure line 11 and a pressure obtained by adding a confirming correction pressure to the initial pressure of the initial line 11 stored in the initial pressure storing step S10, the confirming correction pressure allowing a sufficient rise in the pressure of the low pressure line 11 to be determined. For example, the confirming correction pressure may be 4 bars.

The start control method of an LPDI engine according to the exemplary embodiment of the present invention may further include when the pressure of fuel in the high pressure fuel rail 9 does not exceed the high reference start pressure as the result of the first high reference determination step S30, second start preparation step S70 of closing the first valve 15 of the return line 13 and operating the low pressure fuel pump 25; second high reference determination step S80 of determining whether or not the pressure of fuel in the high pressure fuel rail 9 exceeds the high reference start pressure after the start of the second start preparation step S70; valve opening step S90 of opening the first valve 15 when the pressure of fuel in the high pressure fuel rail 9 exceeds the high reference start pressure as the result of the second high reference determination step S80; and second low reference determination step S100 of determining whether or not the pressure of fuel in the low pressure line 11 has reached a level sufficient for the engine to start after the start of the valve opening step S90. When the pressure of fuel in the low pressure line 11 is sufficient for the engine to start as the result of the second low reference determination step S100, the start step S60 is performed.

That is, when the pressure of fuel in the high pressure fuel rail 9 is determined to be insufficient for the engine to start, the second start preparation step S70 is performed to close the first valve 15 to prevent fuel from returning and operate the low pressure fuel pump 25 as an attempt to increase the pressure of fuel in the high pressure fuel rail 9. When the attempt succeeds, it is attempted to start the engine through the valve opening step S90 and the second low reference determination step S100.

For reference, the first valve 15 may be in an opened or closed position before the first valve 15 is opened in the first start preparation step S40 and before the first valve 15 is closed in the second start preparation step S70. Regardless of the opened or closed position, the first valve 15 is operated to be opened in the first start preparation step S40 and is operated to be closed in the second start preparation step S70.

In the second start preparation step S70, a time period in which the low pressure fuel pump 25 is to be operated at a maximum speed is set by a second timer, the maximum speed being set in consideration of the difference between the high reference start pressure and the pressure of fuel in the high pressure fuel rail 9 and the temperature of cooling water of the engine. While the second high reference determination step S80 is not satisfied in the time period set by the second timer, the low pressure fuel pump 25 continues to be operated at the maximum speed.

The maximum speed set in consideration of the difference between the high reference start pressure and the pressure of fuel in the high pressure fuel rail 9 and the temperature of cooling water of the engine is obtained from a map previously constructed through a number of experiments and analyses. The time period set by the second timer may be, for example, 10 seconds.

When the second high reference determination step S80 is not satisfied after the elapse of the time period set by the second timer, the first valve 15 is opened and the start step S60 is performed.

When the second low reference determination step S100 is not satisfied after the elapse of the time period set by the second timer, the start step S60 is performed.

In the second low reference determination step S100, the pressure of fuel in the low pressure line 11 is determined whether or not it has reached the level sufficient for the engine to start, based on whether or not the pressure of fuel in the low pressure line 11 is greater than a greater one of a minimum start low pressure obtained from a map of minimum start low pressures depending on the temperature of fuel in the low pressure line 11 and the contents of butane of fuel in the low pressure line 11 and a pressure obtained by adding a confirming correction pressure to the initial pressure of the initial line 11 stored in the initial pressure storing step S10, the confirming correction pressure allowing a sufficient rise in the pressure of the low pressure line 11 to be determined. Herein, the confirming correction pressure may be set to be, for example, 4 bars, as in the first low reference determination step S50.

The start control method according to an exemplary embodiment of the present invention as described above attempts to directly start the engine by obtaining a sufficient pressure of fuel in the low pressure line 11 when the pressure of fuel in the high pressure fuel rail 9 is sufficient to start the engine. When the pressure of fuel in the high pressure fuel rail 9 is insufficient to start the engine, the start control method attempts to start the engine after increasing the pressure of fuel in the high pressure fuel rail 9 using the first valve 15 and the low pressure fuel pump 25. It is possible to start the engine as rapidly as possible while obtaining reliability in the start of the engine.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A start control method of an engine using a fuel supply device for a liquefied petroleum direct injection engine, the start control method comprising:
   obtaining a pressure of fuel in a low pressure line and storing the obtained pressure as an initial pressure of the low pressure line in response to an engine start request;
   determining a high reference start pressure that is a minimum pressure of fuel in a high pressure fuel rail at which the engine is configured to start;
   determining whether or not a pressure of fuel within the high pressure fuel rail exceeds the high reference start pressure;
   when the pressure of fuel within the high pressure fuel rail exceeds the high reference start pressure as a result of determining whether or not the pressure of fuel within the high pressure fuel rail exceeds the high reference start pressure, opening a first valve of a return line and operating a low pressure fuel pump;
   when the process of opening the first valve of the return line and operating the low pressure fuel pump is started, determining whether or not the pressure of fuel in the low pressure line has reached a level for the engine to start; and
   starting the engine when the pressure of fuel in the low pressure line has reached the level for the engine to start as a result of the process of determining whether or not the pressure of fuel in the low pressure line has reached the level for the engine to start,
   wherein, in the process of opening the first valve of the return line and operating the low pressure fuel pump, a time period in which the low pressure fuel pump is to operate at a maximum speed is set using a first timer, in consideration of a temperature of a cooling water of the engine, and while the process of determining whether or not the pressure of fuel in the low pressure line has reached the level for the engine to start is not satisfied after the time period set by the first timer has elapsed, the low pressure fuel pump continues to be operated at the maximum speed, and
   wherein the fuel supply device includes:
      a high pressure fuel pump configured for receiving fuel supplied through a supply line from a fuel tank and configured for compressing the fuel to a pressure higher than a pressure at which the fuel has been supplied;
      the high pressure fuel rail configured for buffering the fuel compressed by the high pressure fuel pump and supplying buffered fuel to a direct injector that injects the buffered fuel directly into a combustion chamber:
      the return line connected to the supply line through the high pressure fuel pump to form the low pressure line, the return line allowing a surplus portion of fuel supplied to the high pressure fuel pump from the fuel tank that has not been supplied to the high pressure fuel rail to return to the fuel tank; and
      the first valve disposed on the return line to control a flow rate of returning fuel.

2. The start control method according to claim 1,
   wherein the process of obtaining the pressure of fuel in the low pressure line and storing the obtained pressure is performed by the controller by determining the pressure of fuel in the low pressure line using the first pressure sensor disposed on the low pressure line;
   wherein the process of determining the high reference start pressure is performed by the controller using a temperature of fuel measured using the second temperature sensor disposed on the high pressure fuel rail;
   wherein the process of determining whether or not the pressure of fuel within the high pressure fuel rail exceeds the high reference start pressure is performed by the controller;
   wherein the process of opening the first valve of the return line and operating the low pressure fuel pump is performed by the controller by opening the first valve and controlling the low pressure fuel pump; and
   wherein the process of determining whether or not the pressure of fuel in the low pressure line has reached the level for the engine to start and the process of starting the engine are performed by the controller.

3. The start control method according to claim 1, wherein, in the process of determining the high reference start pressure, the high reference start pressure is determined by adding a correction value to a minimum start high pressure obtained from the temperature of fuel in the high pressure fuel rail and a map of minimum start high pressures depending on contents of butane of fuel in the high pressure fuel rail, the correction value being set in consideration of an error.

4. The start control method according to claim 1, wherein, when the process of determining Whether or not the pressure of fuel in the low pressure line has reached the level for the engine to start is not satisfied after the time period set by the first timer, the process of starting the engine is performed.

5. The start control method according to claim 1, wherein, in the process of determining whether or not the pressure of fuel in the low pressure line has reached the level for the engine to start, the pressure of fuel in the low pressure line is determined whether or not the pressure of fuel in the low pressure line has reached the level for the engine to start, based on whether or not the pressure of fuel in the low pressure line is greater than a greater one of a minimum start low pressure obtained from a map of minimum start low pressures depending on temperatures of fuel in the low pressure line and butane contents of fuel in the low pressure line and a pressure obtained by adding a confirming correction pressure to the initial pressure of the initial line stored in the process of obtaining the pressure of fuel in the low pressure line and storing the obtained pressure, the confirming correction pressure allowing a rise in the pressure of the low pressure line to be determined.

6. The start control method according to claim 1, further comprising:
when the pressure of fuel in the high pressure fuel rail does not exceed the high reference start pressure as a result of the process of determining whether or not the pressure of fuel within the high pressure fuel rail exceeds the high reference start pressure, closing the first valve of the return line and operating the low pressure fuel pump;
after the process of closing the first valve of the return line and operating the low pressure fuel pump is started, determining whether or not the pressure of fuel in the high pressure fuel rail exceeds the high reference start pressure;
when the pressure of fuel in the high pressure fuel rail exceeds the high reference start pressure as a result of the process of determining whether or not the pressure of fuel in the high pressure fuel rail exceeds the high reference start pressure, opening the first valve; and
after the process of opening the first valve is started, determining whether or not the pressure of fuel in the low pressure line has reached a level for the engine to start.

7. The start control method according to claim 6, wherein, in the process of closing the first valve of the return line and operating the low pressure fuel pump, a time period in which the low pressure fuel pump is to be operated at a maximum speed is set by a second timer, a maximum speed being set in consideration of a difference between the high reference start pressure and the pressure of fuel in the high pressure fuel rail and the temperature of cooling water of the engine, and
while the process of determining whether or not the pressure of fuel in the high pressure fuel rail exceeds the high reference start pressure is not satisfied in the time period set by the second timer, the low pressure fuel pump continues to be operated at the maximum speed.

8. The start control method according to claim 7, wherein, when the process of determining whether or not the pressure of fuel in the high pressure fuel rail exceeds the high reference start pressure is not satisfied after the time period set by the second timer has elapsed, the first valve is configured to be opened and the process of starting the engine is performed.

9. The start control method according to claim 7, wherein, when the process of determining whether or not the pressure of fuel in the low pressure line has reached the level for the engine to start is not satisfied after the time period set by the second timer has elapsed, the process of starting the engine is performed.

10. The start control method according to claim 7, wherein, in the process of determining whether or not the pressure of fuel in the low pressure line has reached the level for the engine to start, the pressure of fuel in the low pressure line is determined whether or not the pressure of fuel in the low pressure line has reached the level tier the engine to start, based on whether or not the pressure of fuel in the low pressure line is greater than a greater one of a minimum start low pressure obtained from a map of minimum start low pressures depending on the temperature of fuel in the low pressure line and butane contents of fuel in the low pressure line and a pressure obtained by adding a confirming correction pressure to the initial pressure of the initial line stored in the process of obtaining the pressure of fuel in the low pressure line and storing the obtained pressure, the confirming correction pressure allowing a sufficient rise in the pressure of the low pressure line to be determined.

* * * * *